United States Patent [19]

Jensen

[11] 4,302,152

[45] Nov. 24, 1981

[54] ANTI-MOMENT GYRO FOR WINDMILL

[76] Inventor: Ronald N. Jensen, 208 Greenwell Dr., Hampton, Va. 23660

[21] Appl. No.: 51,376

[22] Filed: Jun. 25, 1979

[51] Int. Cl.³ ............................................. F03D 7/02
[52] U.S. Cl. ...................................... 416/18; 416/60; 416/99; 416/145
[58] Field of Search ............... 416/18, 99, 139 A, 139, 416/145, 175 A, 22, 122 A, 123, 60

[56] References Cited

U.S. PATENT DOCUMENTS

| 1,056,668 | 3/1913 | Happich | 416/99 |
|---|---|---|---|
| 1,425,922 | 8/1922 | Wesnigk | 416/18 |
| 1,628,867 | 5/1927 | Wernicke | 416/175 A X |
| 1,804,352 | 5/1931 | Leka | 416/99 X |
| 2,222,754 | 11/1940 | Von Freydorf | 416/18 X |
| 2,474,359 | 6/1949 | Isacco | 416/22 |
| 2,547,721 | 4/1951 | Stalker | 416/18 |
| 3,251,421 | 5/1966 | Bracey | 416/22 |
| 3,289,770 | 12/1966 | Derschmidt | 416/18 X |
| 3,391,746 | 7/1968 | Cardoso | 446/18 X |
| 3,610,555 | 10/1971 | Nagler | 416/99 X |

FOREIGN PATENT DOCUMENTS

| 618657 | 4/1961 | Canada | 416/22 |
|---|---|---|---|
| 595915 | 4/1934 | Fed. Rep. of Germany | 416/22 |
| 1021619 | 2/1953 | France | 416/99 |
| 1216760 | 4/1960 | France | 416/99 |
| 39680 | 3/1957 | Poland | 416/99 |

Primary Examiner—Everette A. Powell, Jr.

[57] ABSTRACT

An improvement to rotating blades is disclosed in a device that will impose anti-moment forces and result in less stress in the said rotating member. The device consists of a rotating body or gyro which is attached to the said rotating blades, and due to the precession of the gyros, a moment is developed which is counter to the moment forces that are normally imposed on the said blades.

4 Claims, 3 Drawing Figures

ANTI-MOMENT GYRO FOR WINDMILL

BACKGROUND OF THE INVENTION

1. Field of the Invention

This invention generally relates to a method to reduce stresses in rotating members. It uses the forces developed by the precession of a rotating body or gyro, whose axis is parallel with the length of the rotating member or blades.

2. Description of Prior Art

Because of the economics of scale, future windmill systems will be as large as possible. Windmill blades in excess of 300 feet in diameter are now being constructed. These large sizes place tremendous forces or moments on the blades. The forces demand stronger, heavier, and thicker blades. Thus, blades assume a geometry which causes larger air drag as the blades pass through the air.

Likewise the larger blades used on commercial helicopters demand methods to decrease weight of the blades. A method that would reduce forces and thus the weight and air resistance of the blade, will improve the payload potential of a helicopter.

Gyros have for years been used to produce forces within systems. For example, the use of gyros to keep devices in a desired position or to control pitch on boats. The forces developed by gyros as a result of precession are well understood and can be mathematically determined.

It is the object of this invention to reduce stresses in rotating members. This stress reduction will allow the reduction of weight in the blade and its supporting structure. Optimization should also allow the reduction of blade thickness resulting in less resistance as it passes through the air.

SUMMARY OF THE INVENTION

According to the present invention, a rotating body or gyro is attached to the length of a rotating member or blade. The gyro is placed so its axis is parallel to the rotating blade. The force or moment imposed by the gyro's precession is counter to that imposed on the blades due to the acting forces or wind.

DESCRIPTION OF THE PREFERRED EMBODIMENT

Figures 1, 2, 3:
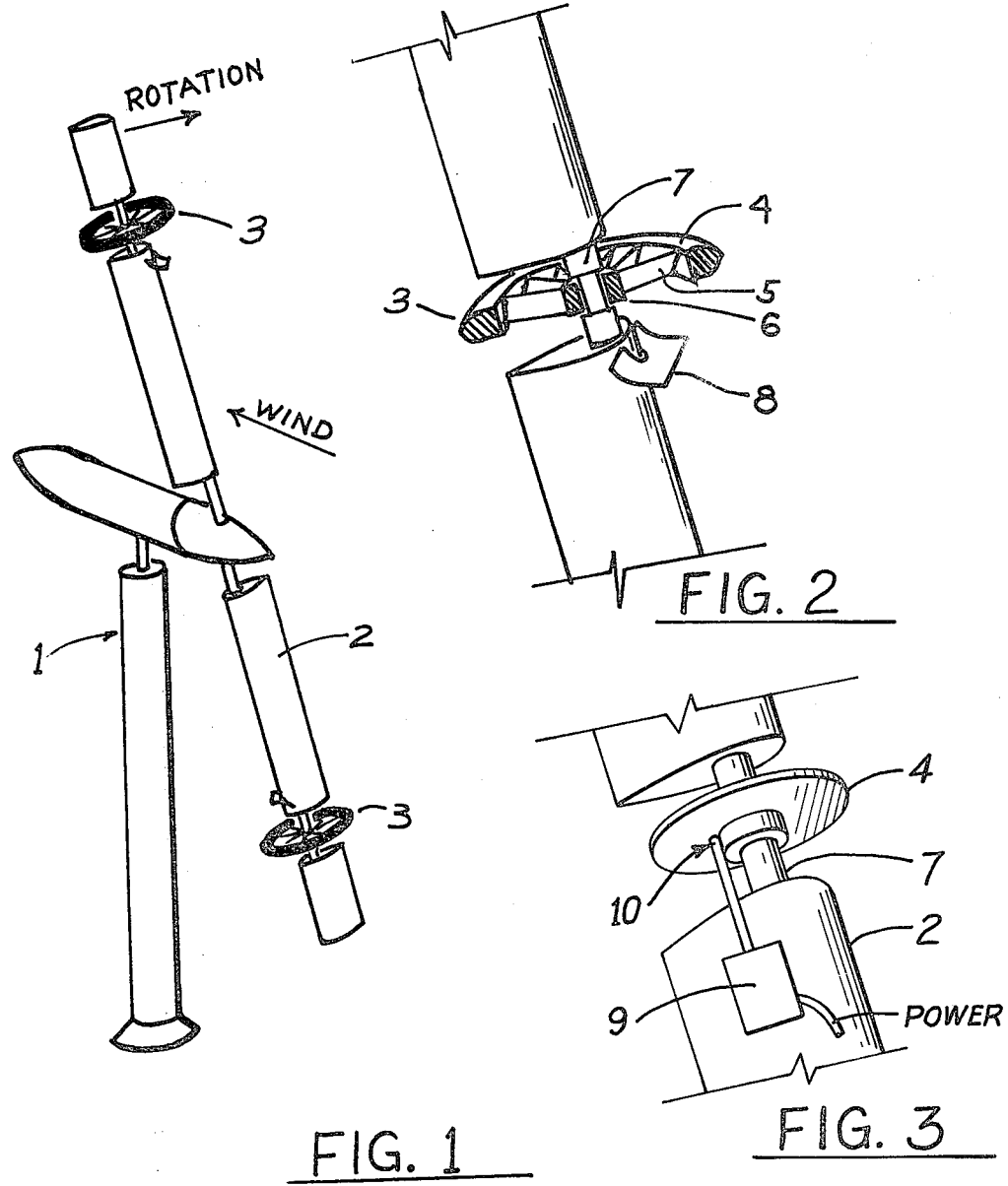
FIG. 1 is a perspective of the anti-moment gyro attached to a windmill.
FIG. 2 is a detail of the gyro assembly on the wind blade and a self-actuating device consisting of a turbine and wind deflector.
FIG. 3 is a detail of the gyro assembly on the wind blade showing the gyro powered by a motor.

Referring to FIG. 1, there is shown a preferred embodiment of the invention as it would be applied and used to reduce forces in a wind blade. As seen, the windmill 1 is equipped with rotating wind blades 2. The blades turn, producing power in the windmill mechanism. On the blade 2, a rotating body assembly or gyro 3 is attached. As shown in FIG. 2 the gyro's rotating body 4 is a heavy wheel which rotates on spokes 5 and a hub 6 from the windmill shaft 7. In this particular arrangement, a deflector blade 8 is placed on the leading edge of the wind blade 2 in such a way as to direct air up and through the spokes 5 which have been sloped and pitched to act as an air turbine . . . thus the air directed through the turbine imposes a rotation to the spokes 5 gyro assembly.

OPERATION

The operation of the invention depends on the rotation of the gyro 3 and its precession when the blades 2 turn, all of which result in a force moment on the blades. As indicated, the force will be counter to forces normally applied to the blades from the wind when the rotation of the gyro is proper. The rotation of the gyro as shown in FIG. 2 is imposed from air as it is directed from the deflector 8 up and through the turbine spokes 5 of the gyro assembly.

In an alternate method of rotating the gyro, FIG. 3. shows that the gyro 4 is rotated about the rotor member shaft 7, which is located on and is a part of the rotating member 2. The gyro 4 is driven by an electric or hydraulic motor 9, and necessary drive member 10.

It will be understood that the foregoing description is the preferred embodiment of the invention and is therefore merely representative. Obviously, there are many possible variations and modifications of the present invention in light of the above teachings. For example:

1. Different types of drives for the gyro assembly such as electric, hydraulic, pneumatic motors, or gear or belt driven from the windmill hub.

2. A gyro assembly may be attached to helicopter blades.

3. A gyro gimbal which allows the gyro assembly to rotate perpendicular to the gyro's normal rotational axis to prevent an unwanted force on the blades when the direction of the wind changes and the windmill is reoriented. It is recommeded that only one direction of freedom of the gimbal is allowed so reorientation will not impose unwanted forces in one direction of orientation but would help the windmill turn the blade when being reoriented in the opposite direction. The turn of the gimbal would be implemented by mechanical means.

What I claim is:

1. In combination with a rotating member having at least two blades, the improvement therewith consisting of a rotatable gyro disposed along the length of each said blade and adapted for rotation about an axis 90 degrees in relation to the rotating axis of said rotating member, and means for rotating said gyro on a shaft of the rotating member, whereby said gyro imposes a moment force on the said shaft due to the gyroscopic precession of the gyro as the rotating member turns and subsequently reduces the stresses in the rotating member.

2. A device according to claim 1 where the said means of rotating said gyro is a combination of an air foil attached to the leading edge of the rotating member and vaned shaped spokes that attach the weighted wheel of the gyro to the hub of the gyro whereby the air foil directs the air flow into the air vanes causing the gyro to rotate.

3. A device according to claim 1 where the said means of rotating said gyro is an electric motor attached to the rotating member and to said gyro whereby when electric power is applied to the motor its rotation is directed to the gyro causing the gyro to rotate.

4. A device according to claim 1 where said means of rotating the gyro is a hydraulic motor attached to said rotating member and serving to drive said gyro.

* * * * *